(12) United States Patent
Cappelle et al.

(10) Patent No.: US 11,161,367 B2
(45) Date of Patent: Nov. 2, 2021

(54) METHOD AND DEVICE FOR MANUFACTURING PRODUCTS HAVING A SURFACE PROVIDED WITH EMBOSSMENTS, AND PRODUCTS OBTAINED THEREBY

(71) Applicant: UNILIN, BV, Wielsbeke (BE)

(72) Inventors: Mark Cappelle, Staden (BE);
Christophe Naeyaert, Jabbeke (BE);
Jasper De Jaeger, Deinze (BE); Guy Van Hooydonck, Schoten (BE)

(73) Assignee: Flooring Industries Limited, SARL, Bertrange (LU)

( * ) Notice: Subject to any disclaimer, the term of this patent is extended or adjusted under 35 U.S.C. 154(b) by 165 days.

(21) Appl. No.: 16/530,568

(22) Filed: Aug. 2, 2019

(65) Prior Publication Data
US 2019/0351695 A1 Nov. 21, 2019

Related U.S. Application Data

(63) Continuation of application No. 14/762,326, filed as application No. PCT/IB2014/058464 on Jan. 22, 2014, now Pat. No. 10,486,459.
(Continued)

(51) Int. Cl.
*B29C 59/04* (2006.01)
*B44B 5/00* (2006.01)
(Continued)

(52) U.S. Cl.
CPC .......... *B44B 5/0047* (2013.01); *B29C 59/002* (2013.01); *B29C 59/04* (2013.01);
(Continued)

(58) Field of Classification Search
None
See application file for complete search history.

(56) References Cited

U.S. PATENT DOCUMENTS 3,462,226 A * 8/1969 Huffaker .................. B41M 3/06
356/72
3,903,791 A * 9/1975 De Ligt ................ B44B 5/0047
101/23
(Continued)

FOREIGN PATENT DOCUMENTS

DE 2530365 A1 1/1977
DE 19523441 A1 1/1997
(Continued)

OTHER PUBLICATIONS

International Search Report from PCT Application No. PCT/IB2014/058464, dated Sep. 5, 2014.

*Primary Examiner* — Matthew J Daniels
*Assistant Examiner* — Mohammad M Ameen
(74) *Attorney, Agent, or Firm* — Workman Nydegger

(57) ABSTRACT

A method for manufacturing a product having a surface provided with embossments, includes bringing a material web is in contact with a roller. The roller is provided with a relief at its surface, with which, via this relief, embossments are formed in the material web. The roller has a circumference of which, or at least certain parts thereof that are variable, or alternatively the circumference of the roller is variable by making use of embossing elements, wherein the mutual angular position thereof is adjustable.

19 Claims, 9 Drawing Sheets

Related U.S. Application Data

(60) Provisional application No. 61/759,112, filed on Jan. 31, 2013, provisional application No. 61/755,140, filed on Jan. 22, 2013.

(51) Int. Cl.

| | | |
|---|---|---|
| *B44C 1/24* | (2006.01) | |
| *B44C 5/04* | (2006.01) | |
| *B44B 5/02* | (2006.01) | |
| *B29C 59/00* | (2006.01) | |
| B29K 27/06 | (2006.01) | |
| B29K 105/00 | (2006.01) | |
| B29L 31/00 | (2006.01) | |

(52) U.S. Cl.
CPC ............... *B44B 5/026* (2013.01); *B44C 1/24* (2013.01); *B44C 5/04* (2013.01); *B29K 2027/06* (2013.01); *B29K 2105/256* (2013.01); *B29L 2031/732* (2013.01)

(56) References Cited

U.S. PATENT DOCUMENTS

| | | | | |
|---|---|---|---|---|
| 4,211,743 A | * | 7/1980 | Nauta | ............... B29C 51/22 264/284 |
| 4,773,959 A | * | 9/1988 | Smith | ............... B29C 59/046 156/220 |
| 5,522,785 A | * | 6/1996 | Kedl | ............... B65H 23/0216 226/174 |
| 5,937,759 A | * | 8/1999 | Mitsam | ............... B44B 5/026 101/378 |
| 2002/0197346 A1 | * | 12/2002 | Papadopoulos | ........... B31F 1/07 425/194 |
| 2009/0078129 A1 | * | 3/2009 | Cappelle | ............... B44C 3/085 100/35 |
| 2010/0297401 A1 | * | 11/2010 | Rasmussen | ......... B29C 48/0017 428/170 |
| 2013/0011512 A1 | * | 1/2013 | Moslehi | ............... B31F 1/07 425/385 |

FOREIGN PATENT DOCUMENTS

| | | |
|---|---|---|
| DE | 102011012735 A1 | 8/2012 |
| EP | 2363299 A1 | 9/2011 |
| GB | 2166388 A | 5/1986 |
| WO | 1991005660 A1 | 5/1991 |
| WO | 2010070474 A2 | 6/2010 |

\* cited by examiner

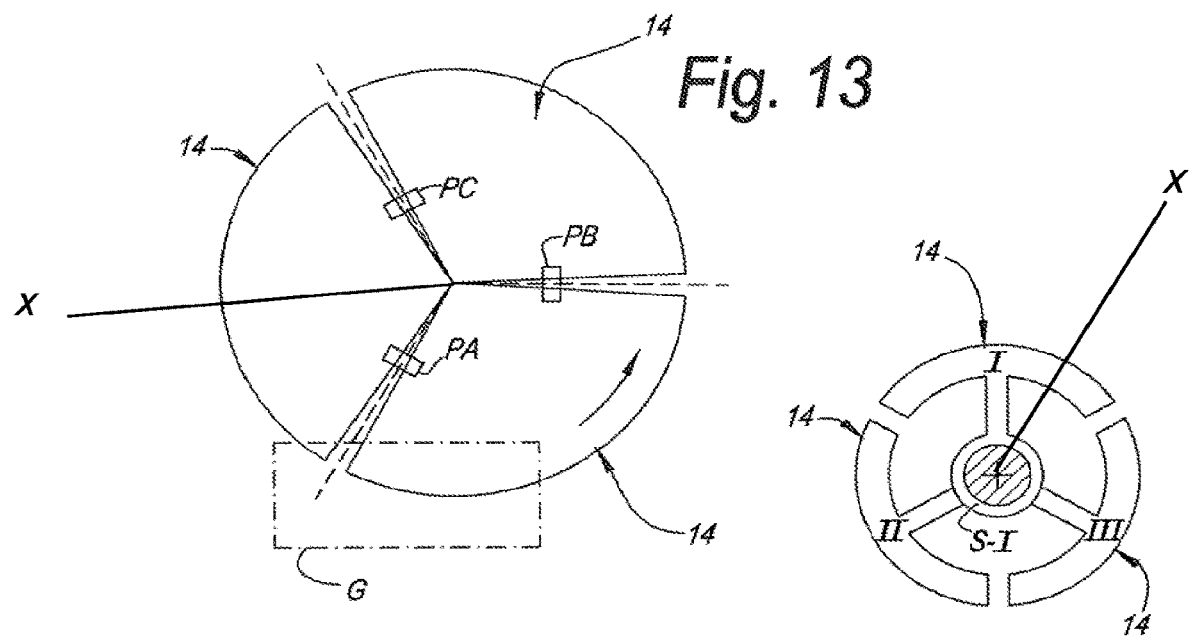
Fig. 13
Fig. 15
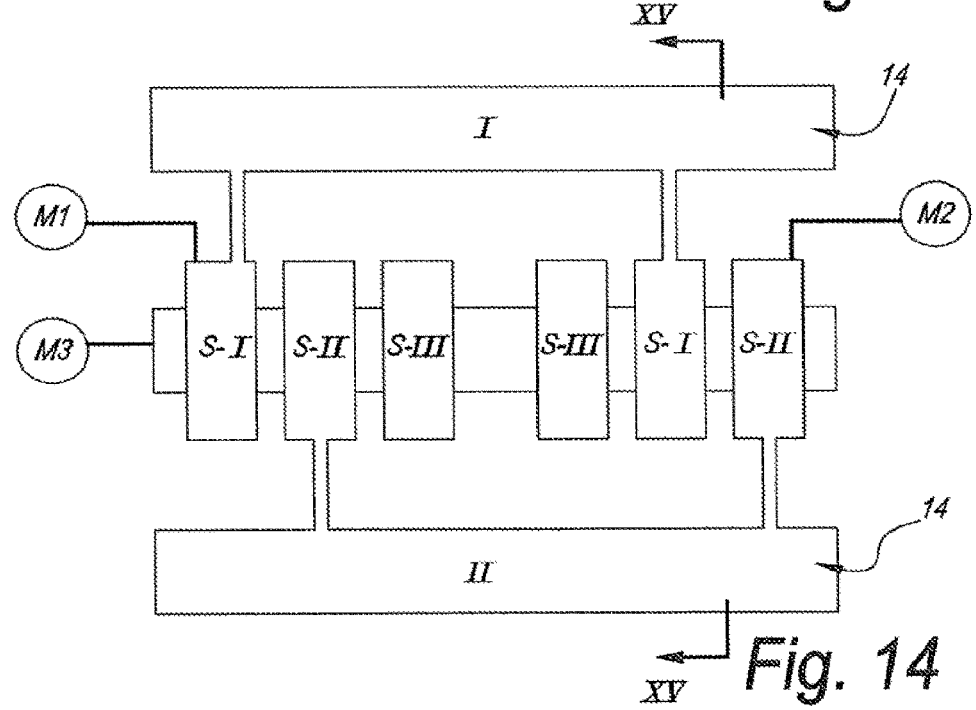
Fig. 14

METHOD AND DEVICE FOR MANUFACTURING PRODUCTS HAVING A SURFACE PROVIDED WITH EMBOSSMENTS, AND PRODUCTS OBTAINED THEREBY

This application is a continuation of U.S. application Ser. No. 14/762,326 which claims the benefit under 35 U.S.C. 119(e) to the U.S. provisional applications No. 61/755,140 filed on Jan. 22, 2013 and No. 61/759,112, filed on Jan. 31, 2013.

This invention relates to a method and device for manufacturing having a surface provided with embossments, as well as to products which are obtained by means of such method or device.

BACKGROUND

1. Field of the Disclosure

More particularly, the invention relates to a method and device for manufacturing floor covering products, and in particular floor panels, which comprise at least a substrate layer and a printed decor provided thereon, preferably in the form of a printed film provided thereon, wherein at least said substrate layer comprises a thermoplastic synthetic material and preferably substantially consists of such thermoplastic synthetic material.

2. Related Art

Such products, more particularly floor panels, are widely known as such. For example, this may relate to so-called vinyl tiles, also called LVT (Luxurious Vinyl Tiles). In such case, the thermoplastic material mostly relates to so-called soft PVC (polyvinyl chloride), or PVC comprising a percentage of plasticizers, as well as possible other additives. Herein, the printed decor may form a representation of a wood motif or stone motif or any other motif, such as a fancy motif.

On the surface of such products, for example, said vinyl tiles, a structure may be provided, formed by embossments, such as a wood structure, a stone structure, respectively. Other embossments may be applied, too, for example, for imitating deeper-situated joints or the like. Further, it is also known that such structure can be performed in register with the printed motif, which in English is called "registered embossed". By such "registering" is to be understood that the structure is performed according to a motif which is adjusted to the printed motif, and consequently the embossments cannot be provided randomly in respect to the printed motif.

Thus, the difficulty with providing such embossments is maintaining the position of the structure motif during the production process sufficiently in accordance with the printed motif, such that possible deviations will not cumulate and/or the deviations will become so substantial that the intended effect will be impaired.

Various techniques for providing embossments, in other words, structuring a surface, are known from the state of the art, however, show various disadvantages, by which they seem to be less suitable in more or less applications.

For example, it is known to realize embossments by means of chemical techniques, for example, by means of selectively foaming thermoplastic material for forming a relief on the surface of the floor covering. However, relief realized by means of a chemical technique is hardly controlled and lacks definition.

According to another known technique, the surface is structured by means of a roller provided with a relief, in other words, a roller having a structured surface. In order to maintain the structured surface of the roller approximately in register with the printed motif which is present on the material web which has to be embossed or to be structured, the displacement performed by the surface of the roller is adjusted in respect to the displacement performed by the material web, by either subjecting the roller to a slipping movement now and then, or by briefly withdrawing the roller. It is clear that these techniques may have a disadvantageous influence on the appearance of the obtained product. Here, too, only extremely short contact times between the roller and the material web can be applied, with the disadvantage that the formed structure often is not sufficiently fixed and the material of the material web will spring back elastically, certainly in the case when this material, at least in the case of thermoplastic material, already has cooled down more or less and thus is less permanently deformable.

According to another technique, the material web which has to be structured or, thus, to be provided with embossments, is bent and pressed on along a roller which is provided with a relief. In this manner, longer contact times can be realized, by which the embossments resulting therefrom will be better preserved. For maintaining the embossments in register with the printed motif, the material web, prior to contact with the roller, will be stretched to a greater or lesser extent. It is clear that, in order to be able to stretch the material web, this web must be sufficiently supple to allow this, as a result of which this method is only suitable for relatively thin, sufficiently stretchable material webs. For example, with glass fiber-reinforced vinyl, this technique is not applicable, as such vinyl is not sufficiently stretchable. Another disadvantage is that the material web has to be subjected to additional tensions, which is not always beneficial to the product. Also, the setting and adjustment is relatively difficult to control.

According to still another known technique, discontinuous pressing devices are applied, which, however, results in a slow and expensive method.

SUMMARY OF THE DISCLOSURE

The present invention primarily aims at offering an alternative technique for manufacturing a product with a surface provided with embossments, in other words, a structured surface, wherein, according to various preferred embodiments thereof, also a solution is offered to the problems with the method of the state of the art.

To this aim, the invention, according a first aspect thereof, relates to a method for manufacturing a product having a surface provided with embossments, wherein a material web is brought into contact with a roller, which roller is provided with a relief at its surface, with which, via this relief, embossments are formed in the material web, characterized in that for said roller use is made of a roller, the circumference of which, or at least certain parts thereof, and more particularly the length of the circumference, is variable, are variable, respectively.

The variability of the circumference can be realized in various manners. According to a first possibility, this is achieved by, as mentioned herein above, realizing the roller such that the length of the circumference is variable. However, other possibilities are not excluded, and a second possibility thus will be described further in the introduction, as well as in the detailed description.

By the relief, herein a structured surface has to be understood which is present on the surface of the roller. After the treatment by means of the roller then embossments are created in the surface of the material web which actually define a structured surface which substantially is the negative of the structured surface of the roller.

By altering the circumference, more particularly the length of the circumference, the distance over which the pattern formed by this relief is repeating on the material web becomes smaller or larger, and the advantage is obtained that an additional parameter is created for exerting an influence on the obtained result.

So, for example, the distance over which the impressed pattern is repeating on the material web, in a simple manner can be adjusted to the distance over which the print present on the material web is repeating, as a result of which both, seen on average, can be brought to mutual conformity. In a preferred embodiment, the method then is also characterized in that, via the relief, embossments are realized which are in register with a printed motif present on the material web, wherein the position of the relief in respect to the printed motif is adjusted by adapting said circumference, and more particularly the length of the circumference of the roller. In this manner, then also so-called "registered embossed" products can be realized, starting from a continuous material web, wherein an adjustment between the positions of the printed motif and the embossment motif can be realized without having to stretch the material web.

According to a preferred embodiment, the material web herein is realized at least, on the one hand, by forming a substrate and, on the other hand, laminating a decor layer, which is made as a film and comprises the printed motif, on the substrate, wherein further preferably a transparent wear layer is provided, too. The decor layer consists, for example, of a sheet of synthetic material which is printed on its decor side. This allows first realizing the decor layer separately by means of a printing technique.

In the case that the method is applied for realizing products which comprise embossments which are in register with the printed motif, the position of the relief in respect to the printed motif preferably is automatically adjusted during performing the method, such by an adjustment performed on the circumference of the roller, for example, by altering, as aforementioned, the length of the circumference. In this manner, a continuous production can be maintained. Herein, the adjustment can be performed by means of detection of the printed motif and/or of marks and by comparing the location thereof with the position of the relief on the web, or by comparing it with the location of the obtained embossments. Preferably, the adjustment of the roller is controlled on the basis of data derived from the material web which still has to be provided with embossments, more particularly from the position of the printed motif.

Preferably, the material web is bent around the roller, such that the cooperation between relief and material web will take place at least over an arc-shaped part. In this manner, a relatively long contact time can be realized, as a result of which the embossments, after being made, thus, when releasing from the roller, usually will retain at least 80% of their structure depth, at least in a number of important applications of the invention, such as in the production of vinyl-based floor covering materials, or similar floor covering materials based on elastic synthetic material.

More particularly, it is preferred that the material of the material web moving along the roller is kept in contact with the roller for at least 3 seconds and still better at least 5 seconds.

In practice, preferably a roller is applied which is provided with one or more embossing elements, preferably segment-shaped and more particularly arc segment-shaped embossing elements arranged along the circumference thereof, which comprise said relief, between which one or more intermediate spaces are present, and wherein the circumference is variable and is varied by varying one or more of the intermediate spaces. The intermediate spaces then preferably will be chosen such that they coincide with technical zones present between the embossment motifs.

According to one of the possibilities, at least two segment-shaped embossing elements are applied. In practical terms, these are two, three or four. On the one hand, in this manner an adequate adjustment can be provided, whereas at the same time still a roller with a not too extensive diameter can be applied.

Preferably, a roller is applied, the circumference of which is variable in that the length of the circumference is variable, or at least the length of one or more parts thereof is variable. According to another preferred characteristic, a roller is applied which is provided with one or more arranged along the circumference thereof segment-shaped, preferably arc segment-shaped, embossing elements comprising said relief, between which one or more intermediate spaces are present and wherein the length of the circumference is altered and adjusted by varying one or more of said intermediate spaces.

In a specific embodiment of the invention, one or more and preferably each of the segment-shaped embossing elements are substantially radially displaceable, either together or each apart. It is clear that in this manner a larger or smaller average radius of the roller can be provided, as a result of which the length of the circumference of the roller alters and the intended effect can be realized.

In combination with the first aspect, the method further can be characterized in that for the roller use is made of a roller with replaceable elements, more particularly said segment-shaped embossing elements, providing the relief. In that the embossing elements have to be made displaceable, they are also suitable for being made replaceable. Such replaceability is useful for replacing defect or worn-out embossing elements, as well as for modifying the device for other embossment motifs. The replaceable elements can be formed by exchangeable press plates.

The method of the invention, described herein above as well as herein below, preferably is applied for forming embossments in a material web which consists of synthetic material or is made on the basis of synthetic material, or which comprises one or more top layers of synthetic material, primarily there where embossments have to be made in a surface thereof, which embossments are in register with a printed motif.

Primarily with material webs where at least the upper material portion, which has to be provided with embossments, comprises a plastically deformable synthetic material, the invention will show its advantages best, in particular as the technique enables a relatively long contact between the roller and the material web, as the material web is kept in contact with the roller over a certain arc length.

Said method is primarily intended and suitable for being applied in the production of floor covering material of synthetic material, more particularly supple synthetic material. In particular, it is intended for being applied for the production of floor covering material on the basis of vinyl, and more in particular for the production of so-called LVT tiles (Luxurious Vinyl Tiles) or similar tiles on the basis of synthetic material.

Said material web preferably consists of a continuous material web, which, after providing the embossments, is cut to form smaller parts, for example, panels, more particularly floor panels, for example, said LVT. On at least a number of the edges of the panels, more particularly floor panels, coupling parts may be formed allowing that a plurality of such panels can be coupled to each other, wherein the coupling parts provide for a locking in a direction perpendicular to the plane of the panels, as well as in a direction in the plane of the panels and perpendicular to the edges concerned.

According to a particular embodiment, the material web is supplied to the roller in a heated condition and the roller is cooled. Hereby, the material fed on the roller can be provided with embossments in a smooth manner, at least when this relates to thermoplastic material, whereas the subsequent cooling ensures that a fixing of the structure is obtained.

The invention also relates to a device for performing the method of the aforementioned, and below explained further, first aspect of the invention. To this aim, it relates to a device for manufacturing a product having a surface provided with embossments, with a processing station for forming embossments, wherein a material web is brought into contact with a roller, which roller is provided with a relief on its surface, by which via this relief embossments are formed in the material web, characterized in that for said roller use is made of a roller having a variable circumference.

According to a first possibility, the circumference of the roller is variable in that the length of the circumference can be altered.

According to a second possibility, the circumference is variable in that the roller consists of at least two embossing elements having a variable mutual angular position. This second possibility will be explained in greater detail further below.

Preferably, this device is further characterized in that it comprises an adjustment system with which, in the case that a relief is used which is intended for being in register with a printed motif present on the material web, the position of the relief in respect to the printed motif is adjusted, this by adapting the circumference of the roller, wherein this adjustment system preferably provides for an automatic adjustment.

In a practical embodiment, the device, downstream of said processing station, comprises a production unit in which the material web, or at least a substrate of this material web, is produced. The use of such roller in fact allows an easy application thereof in combination with such production unit.

According to a second independent aspect, the invention also relates to a method for manufacturing a product having a surface provided with embossments, wherein a material web is brought into contact with a roller, which roller is provided with a relief on its surface, by which via this relief embossments are formed in the material web, with the characteristic that for said roller, use is made of a roller which is provided with one or more replaceable embossing elements which are provided with said relief. Preferably, said embossing elements are formed by exchangeable press plates which are provided on the circumference of the roller, wherein these may be, for example, exchangeable as such or together with supports on which they are provided. According to an alternative, more solid elements are applied in which the relief is directly provided.

The method of the second aspect also shows its advantages best in the production of floor covering material of synthetic material, and more particularly floor covering material selected from:

floor covering material of supple synthetic material;
floor covering material on the basis of vinyl;
floor covering in the form of so-called LVT tiles (Luxurious Vinyl Tiles), or similar tiles.

The invention also relates to a device by which the method of the second aspect can be realized. Thus, it also relates to a device for manufacturing a product having a surface provided with embossments, with a processing station for forming the embossments, wherein a material web is brought into contact with a roller, which roller is provided with a relief on its surface, by which via this relief embossments are formed in the material web, characterized in that the roller is provided with one or more replaceable embossing elements which are provided with said relief.

It is clear that the invention also relates to products, more particularly floor covering products, and in particular floor panels which are obtained by means of a method or device as described herein above. According to a preferred application, this relates to so-called LVT tiles or similar products manufactured on the basis of synthetic material.

It is noted that the invention primarily is intended for being applied for manufacturing floor panels of synthetic material, more particularly of the LVT type or the like. The fact that said intermediate spaces vary due to adjusting the roller and/or that there are intermediate spaces between the exchangeable embossing elements, does not form a problem here, as those can be made to coincide with technical spaces, where, for example, after the floor panels have been formed by cutting them, coupling parts have to be formed at the edges.

It is noted that per segment-shaped embossing element a plurality of floor tiles can be embossed.

Although the invention is particularly suitable for being applied, as aforementioned, in the manufacture of floor panels, it is not excluded to use them, according to said first aspect as well as to said second aspect, in a supple floor covering, preferably on the basis of vinyl, which is intended for being marketed on a roll, wherein the printed motif and the embossments to be realized then will be adapted to each other in such a manner that the transitions at the possible intermediate spaces are acceptable.

According to an important preferred characteristic of the first as well as of the second aspect of the present invention, use is made of a roller having a relatively large diameter, preferably of at least 60 centimeters, and still better larger than 1 meter. This offers the advantage that a small radial displacement of the embossing elements swiftly results in a noticeable enlargement of the circumference length, such that a smooth adjustment is possible. These minimum diameters are also useful for obtaining that the material web to be treated does not have to be subjected to an extremely sharp bending, which in its turn still allows smoothly bending relatively stiff material webs, such as vinyl substrates reinforced with a glass fiber layer or the like, over a certain arc length along the surface of the roller, even if the material web is structured in cold or almost cold condition, which means on ambient temperature. Such relatively large diameters also offer the advantage that a relatively large structured surface is obtained in passage direction, such that smoothly a plurality of embossing elements can be provided in circumferential direction on the roller. Irrespective whether one or more embossing elements are provided, the advantage will also be obtained that the motif of the structure will be repeated over a relatively large length only, such that a relatively large variety of, for example, vinyl tiles can be realized.

In the case of the first aspect, it is clear that the dimension by which the length of the circumference must be able to vary is chosen such that sufficiently large changes can be performed, such that the position of the relief in respect to the printed motif can always be brought into mutual conformity. It is clear that the dimension of the interval over which changes must be able to be performed can be determined by the person skilled in the art. With diameters of more than 1 meter, preferably an adjustment possibility is provided which is at least several millimeters, however, still better is 2 to 3 centimeters.

It is noted that the floor panels or tiles, more particularly the motifs thereof, can be provided on the circumference of the roller in at least two manners, either with their longitudinal direction according to the circumferential direction of the roller, or with their longitudinal direction in axial direction of the roller. With motifs wherein the structure substantially extends in the longitudinal direction of the floor panels, for example, with wood motifs, it is preferred that the motifs are performed with their longitudinal direction according to the circumferential direction of the roller, as this offers the advantage that possibly enclosed vapors or air are pressed away more smoothly from between the material layer and the roller and thereby have no disadvantageous impact on the structuring.

As described herein above, according to the first aspect use is made of a roller of which the circumference, or at least certain parts thereof, are variable. Herein above, it was explained that this, more particularly, thus, in a particular embodiment, is the length of the circumference which is variable, such by altering, for example, the diameter of the roller or at least radially displacing certain parts thereof.

It is noted that, as already explained above, by a roller with a "variable circumference" not exclusively an alteration of the circumference length and/or diameter has to be understood. Also other kinds of alterations taking place at the circumference of the roller are to be considered, in as much as such adaptations, of course, will result in the fact that the location of the embossments can be adapted in respect to a motif, in particular a printed motif.

According to a particular preferred embodiment, which forms a second possibility of the first aspect of the invention, two or more embossing elements located along the circumference are applied, wherein the mutual angular position between at least two and preferably all successive embossing elements is variable and adjustable, preferably without therein having to perform a radial displacement. In this manner, each time the first subsequent embossing element which has to come into contact with the material web can be altered in angular position in respect to the preceding embossing element for adjusting in this manner the distance between the successive embossment patterns, preferably in function of the printed motif. It is clear that in this manner a simple "registered embossing" can be achieved.

The mutual angular position can be realized in any manner. Preferably, the embossing elements each are driven separately, for example, by means of servo motors, and in this manner are positioned in mutual respect. According to another possibility, the mutual positioning is performed by means of positioning means which are active between the rotating embossing elements.

Preferably, herein only two embossing elements are applied, which thus each cover approximately half a circumference. However, the application of more than two, for example, three or four embossing elements is not excluded. It is clear that the embossing elements in such case, too, preferably are realized as segment-shaped, preferably arc segment-shaped, elements.

Preferably, each embossing element is balanced, either entirely or partially balanced.

The technique making use of the angular rotation instead of a radial displacement offers the advantages that a more robust support is possible and no radial forces have to be created during adjustment. Another advantage is that no radius differences occur at the circumference.

It is clear that the technique making use of the angular rotation instead of a considerable alteration of the length of the circumference of the roller, can also be applied in combination with one or more of the characteristics already described herein above, in as much as such combination does not comprise any contradictory characteristics. Herein, this relates, on the one hand, to the characteristics relating to the roller itself and the arrangement thereof, such as the fact whether or not exchangeable embossing elements are applied, the fact that a heating and cooling is provided, the fact that embossing elements are applied which are arc segment-shaped, the fact that the material web is fed around a portion of the circumference, and so on, as well as, on the other hand, the characteristics relating to the fields of application, in other words, for example, for the production of material webs on the basis of synthetic material and in particular the production of vinyl-based floor panels and the like, and so on.

The invention, according to said first as well as said second aspect, also is particularly useful for forming embossments in a material web which consists of a multi-layered sheet-like material, preferably with a printed motif, and the method thus is applied for forming embossments on the surface which preferably are in register with the motif. Within the scope of such application, the method thus can be applied for manufacturing a structured film or a structured laminate sheet, with embossments which preferably are in register with the motif. Up to the present, such laminate sheets were difficult to provide with an embossment motif which is in register with the printed motif, certainly not in a continuous production process. The technique of the invention, however, allows this. Thus, the finally cut therefrom laminate sheets then can be applied by furniture makers, interior installers and the like, for example, for being glued on a supporting structure. In such laminate sheets, use can be made of thermoplastic materials, such as PVC, as well as thermo-hardening materials, such as resins, for example, melamine resins, wherein carrier sheets for the synthetic material, such as paper, may or may not be employed.

Consequently, the technique of the invention can also be applied in the production of so-called HPL (High Pressure Laminate) and CPL (Compact Laminate).

Finally, it is noted in general that by a "roller" in the broadest sense a rotatable element has to be understood, irrespective whether the global contour thereof is formed by separate elements or not, which in their turn then can be separately rotatably supported or not.

Generally stated, a roller according to the invention can also be defined as a roller which is provided with means by which the distance over which embossment patterns made by this roller can be altered by changes in the roller itself, such preferably by providing an adjustment possibility with which the intermediate distance between two or more successive embossing elements can be altered. If only one embossing element is applied, which extends along the circumference of the roller, the intermediate distance between the beginning and end can be adjusted in order to realize the invention.

Further characteristics will become clear from the detailed description and claims following below.

BRIEF DESCRIPTION OF THE DRAWINGS

With the intention of better showing the characteristics of the invention, herein after, as an example without any limitative character, some preferred embodiments are described, with reference to the accompanying drawings, wherein:

FIGS. 8 to 16 still relate to a number of variants of the invention.

DETAILED DESCRIPTION OF PREFERRED EMBODIMENTS

Figure 1:
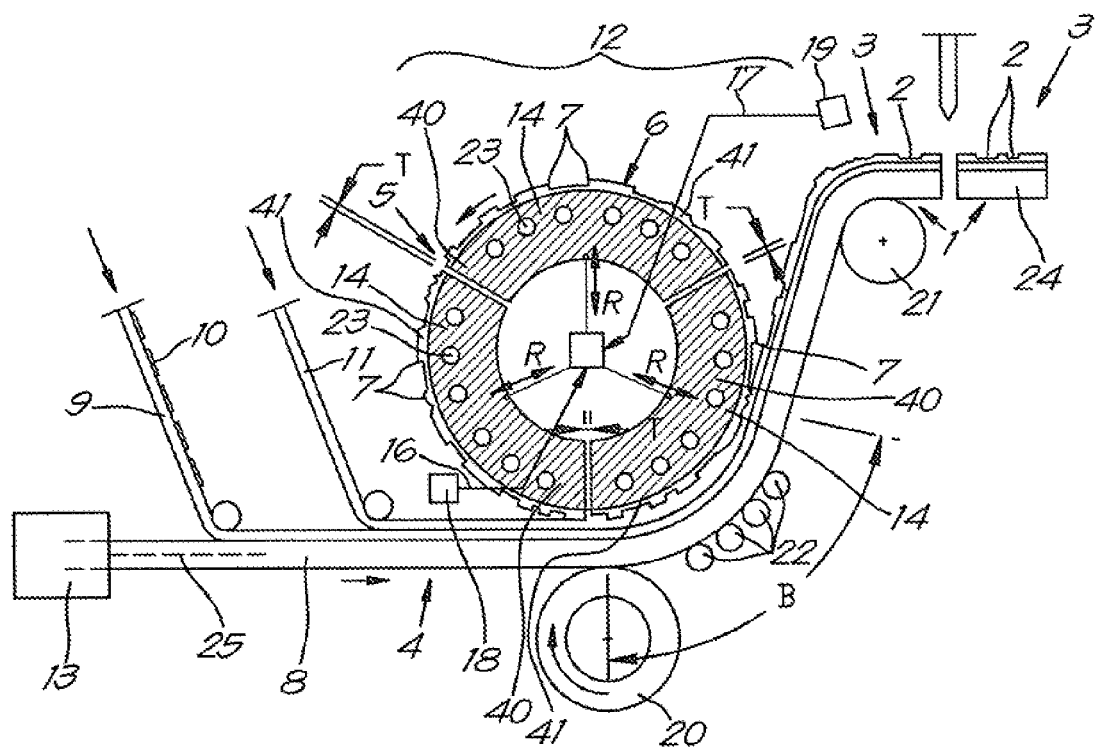
FIG. 1 schematically represents an embodiment of the method according to the invention, as well as schematically illustrates a device according to the invention applied for this purpose.

In FIG. 1, schematically a method is represented for manufacturing, according to the invention, a product 1 having a surface 3 provided with embossments 2, wherein a material web 4 is brought into contact with a roller 5, which roller 5 is provided with a relief or structure 7 on its surface 6, in other words, a profiled surface, wherein said embossments 2 are formed in the material web 4 via this relief.

In the represented example, the material web consists of a substrate 8 and at least a decor layer 9 which is made as a film and is laminated on the substrate and which comprises a printed motif 10. Moreover, preferably also a transparent wear layer 11 is provided on top of the whole, which wear layer preferably also comprises thermoplastic synthetic material.

Herein, the roller 5 forms the most important part of a processing station 12 for forming the embossments 2. The substrate 8 can be supplied prefabricated from a reel or the like or can also be produced upstream of said processing station 12 in a production unit 13, either by forming the substrate 8 there from a basic material substantially on the basis of synthetic material, for example, synthetic material pellets, or by laminating various prefabricated layers on top of each other, or also by forming a substrate by means of a so-called gelling process. According to variants, other manufacturing techniques for the substrate are not excluded. The printed decor layer 9 and the wear layer 11 are laminated on the substrate and can be supplied from not represented supply reels. Lamination can take place by means of mutual fusion and/or by the intermediary of additionally added substances, such as plastisols, or also in any other manner. In consideration of the fact that various known techniques are possible, providing the decor layer 9 and the wear layer 11 on the substrate is illustrated in a schematic manner only.

The particularity of the invention consists in that for the roller 5, use is made of a roller, of which the circumference, and in this case the length of the circumference, is variable, such that with length variations occurring in the printed motif 10, which means that the distance over which a motif is repeated, will vary, also the average length over which the relief 7 extends per rotation can be adapted, in such a manner that the relief 7, seen on average, remains in register with the passing printed motif 10.

In the example, for this purpose use is made of a plurality, in this case three, of segment-shaped embossing elements or structuring elements 14, which are arranged along the circumference and can be moved radially apart, with the consequence that the total circumference thereof alters in size in that the intermediate spaces T then also change. The radial displacement is indicated by arrows R. This displacement can be realized in any manner and, as schematically represented, is performed by a drive system 15 integrated in the roller 5. This drive system 15 preferably is controlled automatically on the basis of, for example, either a feed forward 16 or a feedback 17. Herein, by means of a sensor or any other detection mechanism, 18 and 19, respectively, a control is performed on the location of the print, possibly by means of marks provided in the decor layer 9, after which the circumference of the roller 5 is adjusted in function hereof and by means of the drive system 15.

As described in the introduction, the material web 4 preferably is bent around the roller 5, such that the cooperation between the relief 7 and the material web 4 is performed at least over an arc-shaped part B, by which a longer contact of preferably at least three seconds is maintained between the surface of the roller and the material web 4.

In the example, the pressing on and bending over the roller 5 is performed by means of a roller 20, preferably with a relatively soft surface, for example, of rubber, and a bending roller 21, which may consist of any material. It is clear that possible other pressing on means can be applied, or also additional pressing on means, such as the represented rollers 22, may be applied.

As mentioned in the introduction, the material web 4 possibly can be supplied to the roller in a more or less heated condition, either with residual heat originating from a preceding manufacturing process, or by preceding heating, whereas the whole is cooled during providing the embossments, preferably via a cooling of the roller 5, in this case by means of a cooling liquid flowing through a cooling circuit 23 of the roller.

Subsequently, the final product possibly may be cut to smaller pieces, such as, for example, LVT tiles 24.

Possibly, a glass fiber reinforcement layer 25 can be incorporated into the substrate.

It is noted that the various layers of the material web 4 are represented schematically. In reality, the layers 9 and 11 are thin films, whereas the substrate 4 determines the fundamental thickness. Backing layers may be applied, too.

In the case of vinyl or the like, the material web 4 preferably has a thickness of 2 to 6 mm.

It is noted that the segment-shaped embossing elements 14 do not necessarily have to be radially displaced in a simultaneous manner, but that they can also be controlled separately, for example, in that each segment, immediately before coming into contact with the material web, is brought into the desired radial position.

It is also clear that the roller 5 preferably is driven by a not represented motor. Also, the rollers 20-21 may or may not be driven.

Figure 2:
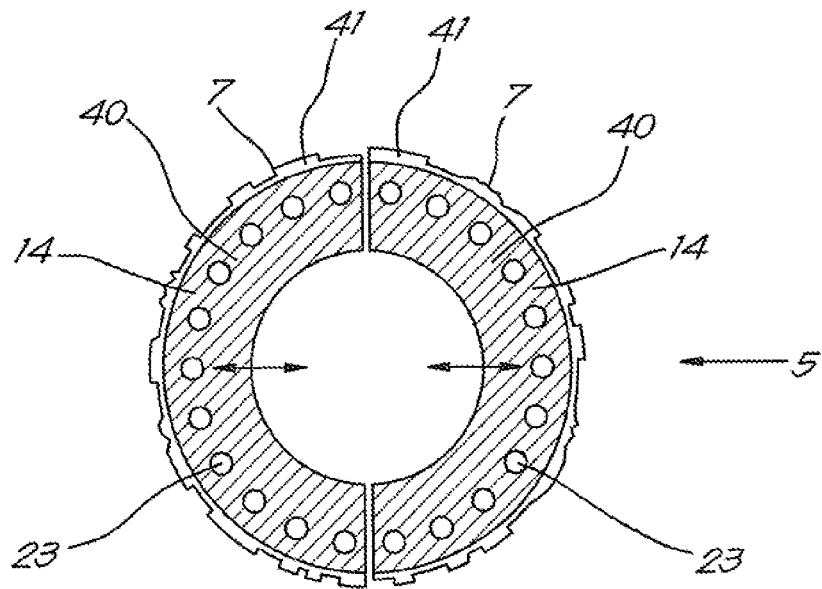
FIG. 2 represents a variant to the embodiment of the roller.

In FIG. 2, a similar roller 5 is represented schematically, however, having only two instead of three segment-shaped embossing elements 14.

Figure 3:
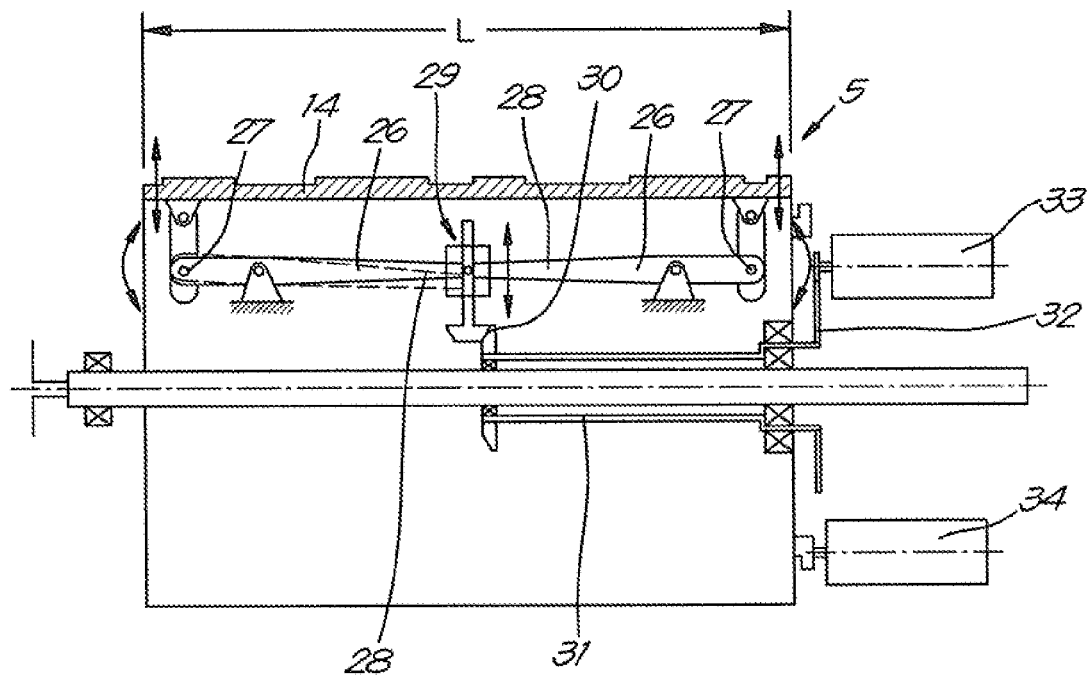
FIGS. 3 and 4 in a schematic manner represent two drive systems which can be applied in a roller according to the first aspect of the invention.

In FIG. 3, a mechanical drive system for displacing the segment-shaped embossing elements 14 is represented schematically, which system consists of lever arms 26 carrying the segment-shaped embossing elements on one extremity 27 and which can be displaced on their other extremities 28 via a spindle system 29. The spindle system is driven via transmission elements 30-31-32 by means of a servo motor 33. The transmission system is illustrated for one embossing element 14 only, however, it is clear that via the same servo motor 33 and respective coupled thereto transmission means a plurality of embossing elements can be driven simultaneously.

Driving the roller 5 is performed by means of the motor 34.

Generally, it can be stated that the above-described rollers 5 can be made with any axial length L. A practical length is from one meter to several meters.

Figure 4:
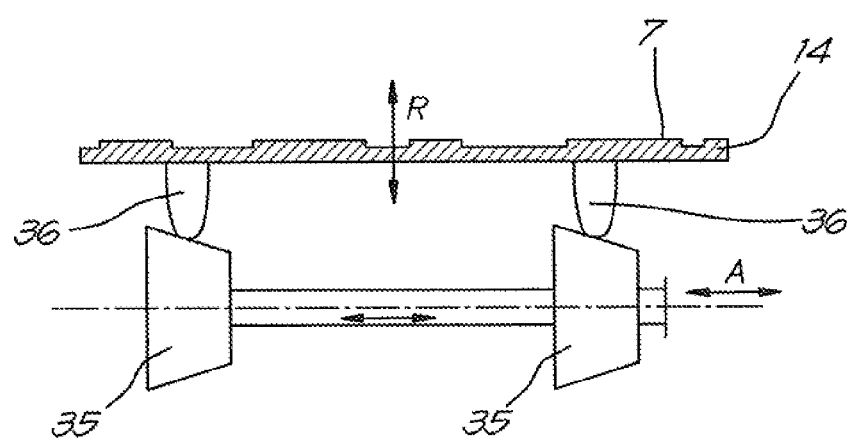

In FIG. 4, a variant is illustrated with conical elements 35 which, by an axial drive and displacement A thereof, provide for a radial displacement R on the embossing elements 14, by working in conjunction with parts 36 thereof.

Figure 5:
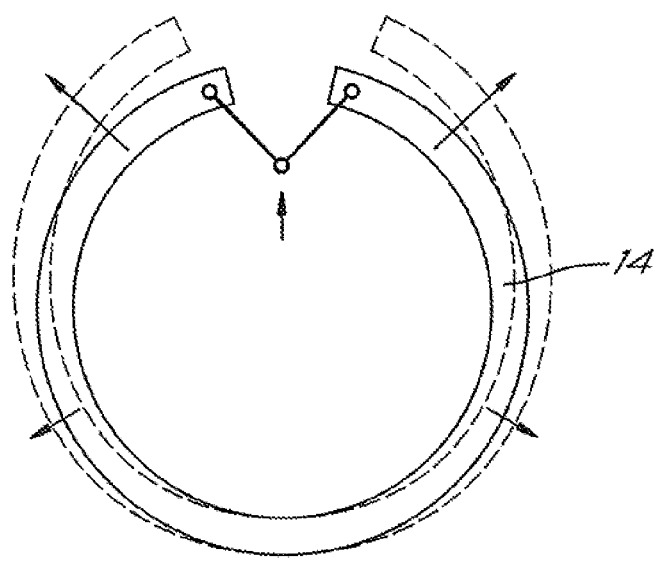
FIG. 5 strongly schematized represents another variant of the embodiment of FIG. 2.

FIG. 5 shows in a strongly schematized manner that the enlargement of the circumference can also be realized with only one segment-shaped embossing element 14, which, for example, can be pressed open, as schematically represented.

Figures 6, 7:
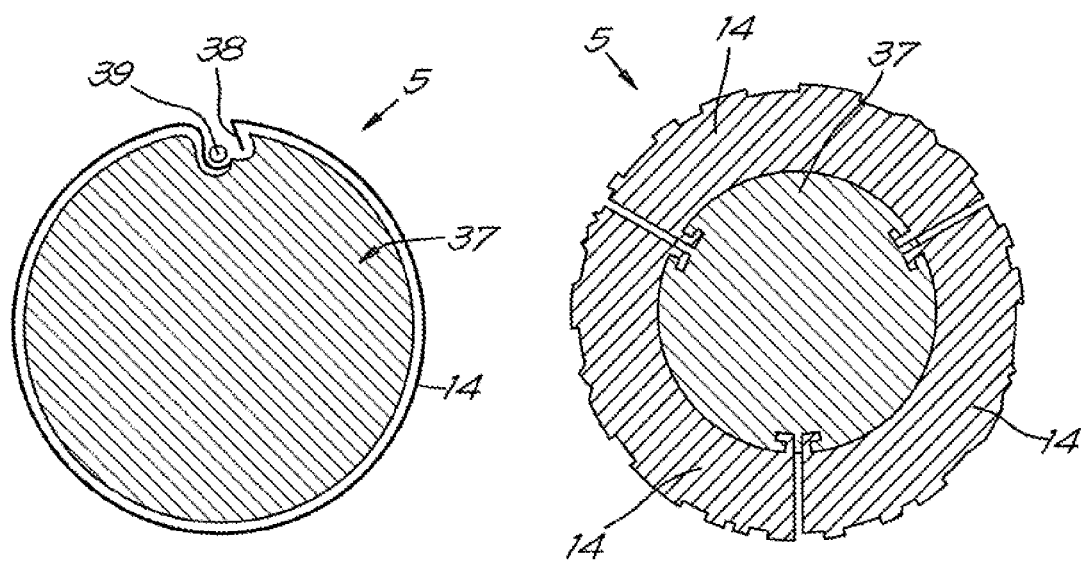
FIGS. 6 and 7 schematically represent two possibilities of embodiments of the second aspect of the invention.

In FIG. 6, the second aspect of the invention is represented schematically, wherein the roller 5 is provided with one replaceable embossing element 14, in this case in the form of a press plate which is tensioned around a basic part 37. In principle, this tensioning can be performed in any manner. A practical possibility consists in that, as schematically illustrated, the press plate, on one extremity, is fixedly hooked in a seat via a formed thereon hook-shaped part 38, and on the other extremity is clamped into a seat by means of another attachment element 39.

FIG. 7 schematically represents another possibility of the second aspect, wherein a plurality of segment-shaped embossing elements 14 are provided on a basic part 37 in an exchangeable manner. In this case, they can be mounted and dismounted, for example, by means of an axial movement over the basic part 37.

It is clear that the first and the second aspect can also be combined, for example, by working in FIGS. 1 through 5 with replaceable embossing elements or partially replaceable embossing elements. So, for example, may parts 40 be used, which form a carrier for parts 41, for example, in the form of a press plate, which latter then function as the actual embossing parts, wherein the parts 41 are replaceable in accordance with the second aspect of the invention.

Also, in respect to the methods as well as in respect to the devices, all herein above-described operations and components pertaining to the first aspect may also be applied in the second aspect and reverse; such in all possible combinations, in as far as such combinations are not contradictory.

Figure 8:
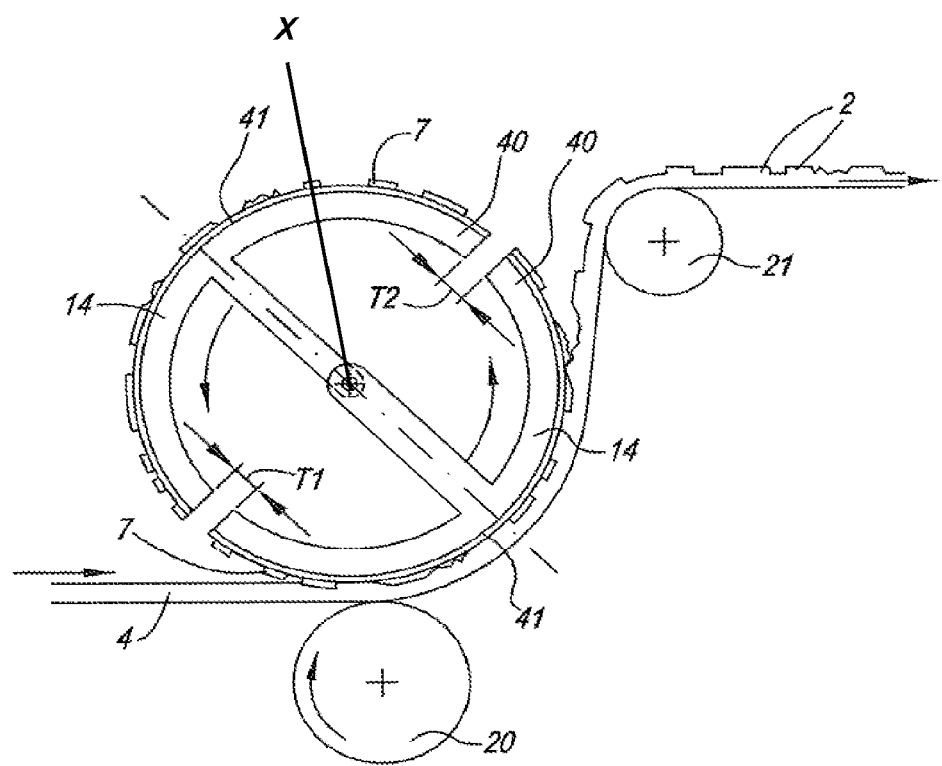
Figure 9:
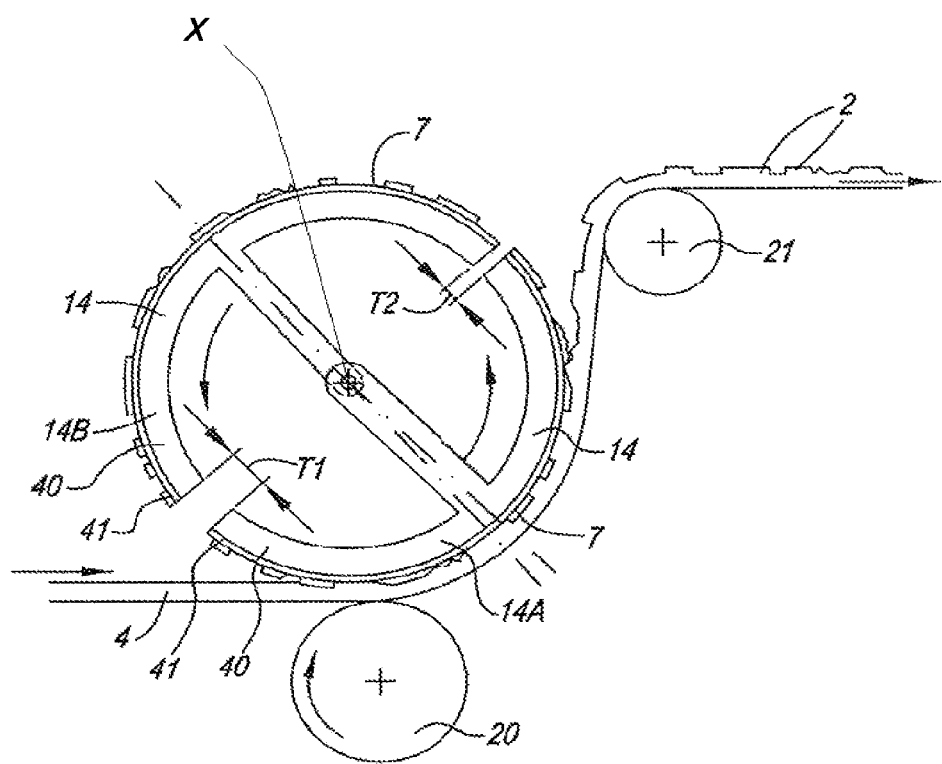

In FIGS. 8 and 9, schematically an important variant of the first aspect of the invention is represented, wherein, as aforementioned, an adjustment is provided of the mutual angular position about axis X of the embossing elements 14, in this case arc segment-shaped embossing elements.

In the example of FIGS. 8-9 two approximately half-cylindrical embossing elements 14 are used. In the condition of FIG. 8, those are in positions situated precisely diagonally opposite, with equal intermediate spaces or intermediate distances T1 and T2. If now a larger "repeat" distance is necessary, for example, by a larger stretching, the distance T1 can be enlarged by providing a suitable mutual angular adjustment and, as illustrated in FIG. 9, applying a larger distance T1 before the embossing element, which as next has to be brought into contact with the material web 4, actually contacts the material web. Thus, 14B is adjusted in respect to 14A about the axis X. After then only 14B is in contact with the material web, 14A in its turn can be positioned in respect to 14B in order to then adjust the desired distance T2.

Of course, this all can take place with the necessary controls and in a variety of applications, analogous as herein above described in the introduction or by means of FIGS. 1 to 7.

Each embossing element 14 can be driven by a separate motor, for example, servo motor, and/or be controlled by means of mutual drives. However, other driving systems are not excluded. In consideration of the fact that the drives are of any kind, they are not specifically illustrated in FIGS. 8 and 9 as well as in the FIG. 10 described below.

Figure 10:
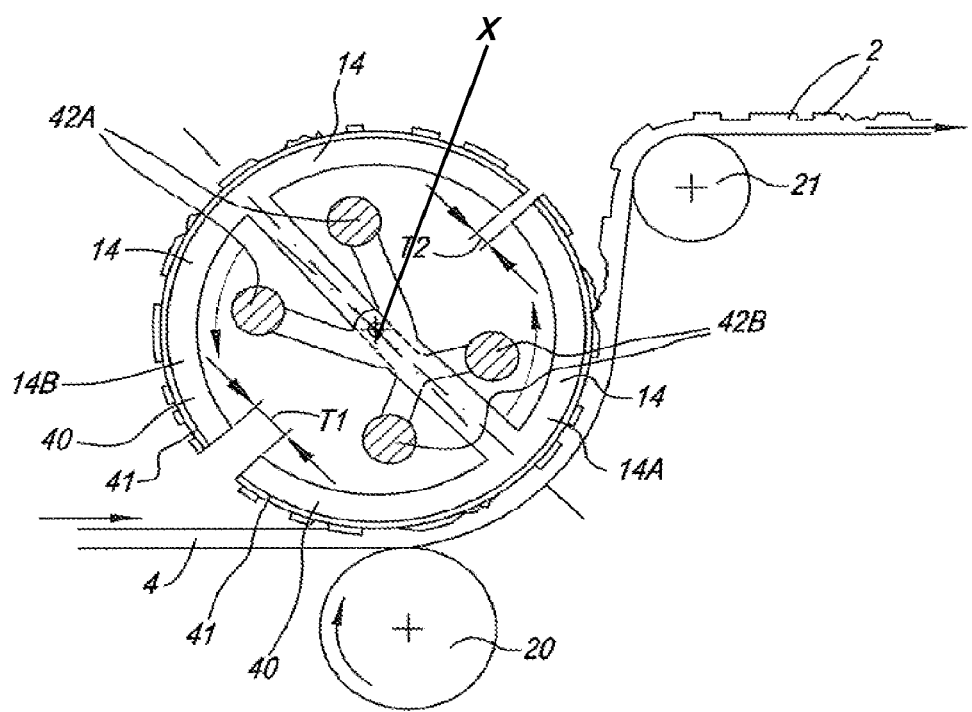

FIG. 10 shows that the whole can be balanced with counterweights 42A-42B, preferably for each embossing element.

It is clear that in all embodiments the embossing elements 14 can be cooled.

FIGS. 11 to 16 represent, strongly schematized, still a number of other embodiments, wherein use is made of mutually rotatable embossing elements about axis X, herein below also called segments. Herein, three segments are represented; however, other numbers are not excluded, either.

Figure 11:
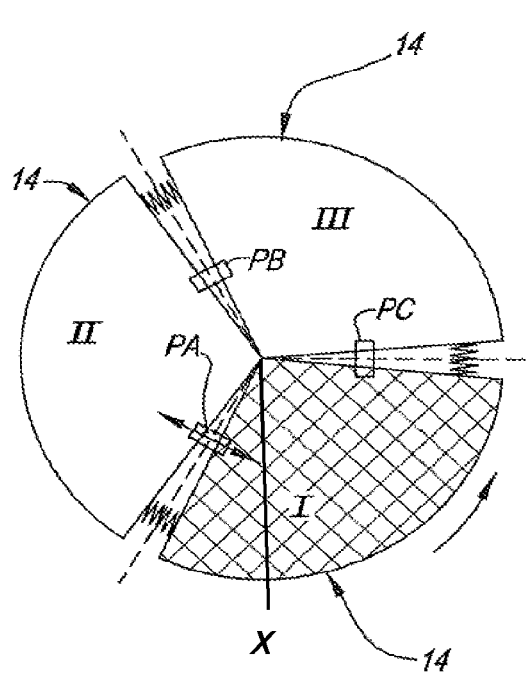
Figure 12:
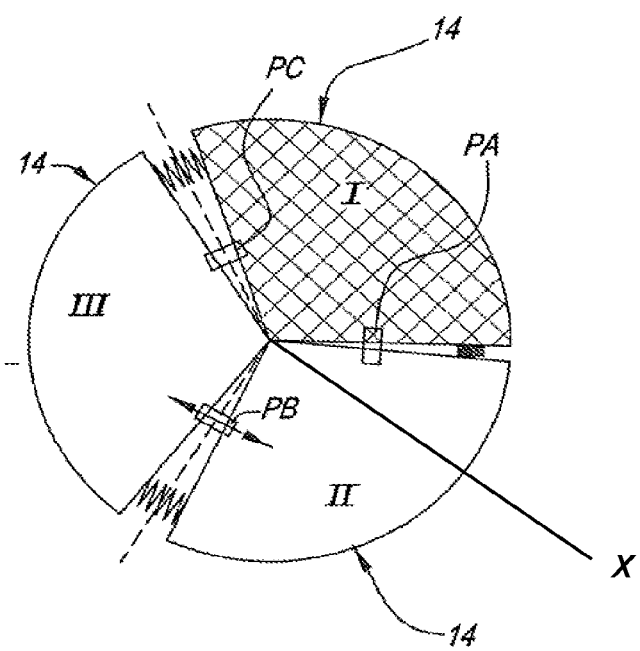

In FIGS. 11 and 12, an embodiment is represented with springs as well as positioning systems, for example, servos or the like, between the segments or embossing elements I-II-III. Possibilities without springs are possible, too, as explained further on. In FIG. 11, servo PA is switched on and positions segment II so far in respect to segment I that the embossments remain in register with the decor. Servos PB and PC are not active and segment III is being centered by means of the springs between the segments I and II. When segment I leaves the material web, as in FIG. 12, servo PA is switched off and segment I centers between II and III. Then servo PB has to be switched on for positioning segment III in respect to II, and so on. Of course, a general drive is there, too.

FIG. 13 makes clear that the centerings and springs are not necessary. One can also work with control means only, such as servos PA-PB-PC or hydraulic positioning systems and the like, which then each have to provide for the appropriate mutual displacements. The general rotational movement has to be performed via, for example, a drive in the region G.

Instead of using a general drive G, separate main drives can be used as well. FIGS. 14 and 15 schematically illustrate an example. Via supports S-I and S-II, the segments or embossing elements I and II are freely rotatable supported on the shaft and each are rotated around the shaft by motors M1 and M2, for example, servo motors. The supports S-III of segment III are fixedly provided on the shaft, which is driven via motor M3. By simultaneously driving the motors M1-M2-M3 and appropriately providing for a mutually advanced or delayed movement, the distance between two segments successively contacting the material web can be set each time.

FIG. 15 is a schematized cross-section according to line XV-XV in FIG. 14. The embossing element III is not represented in FIG. 14, in consideration of the fact that it is situated on the rear side.

Figure 16:
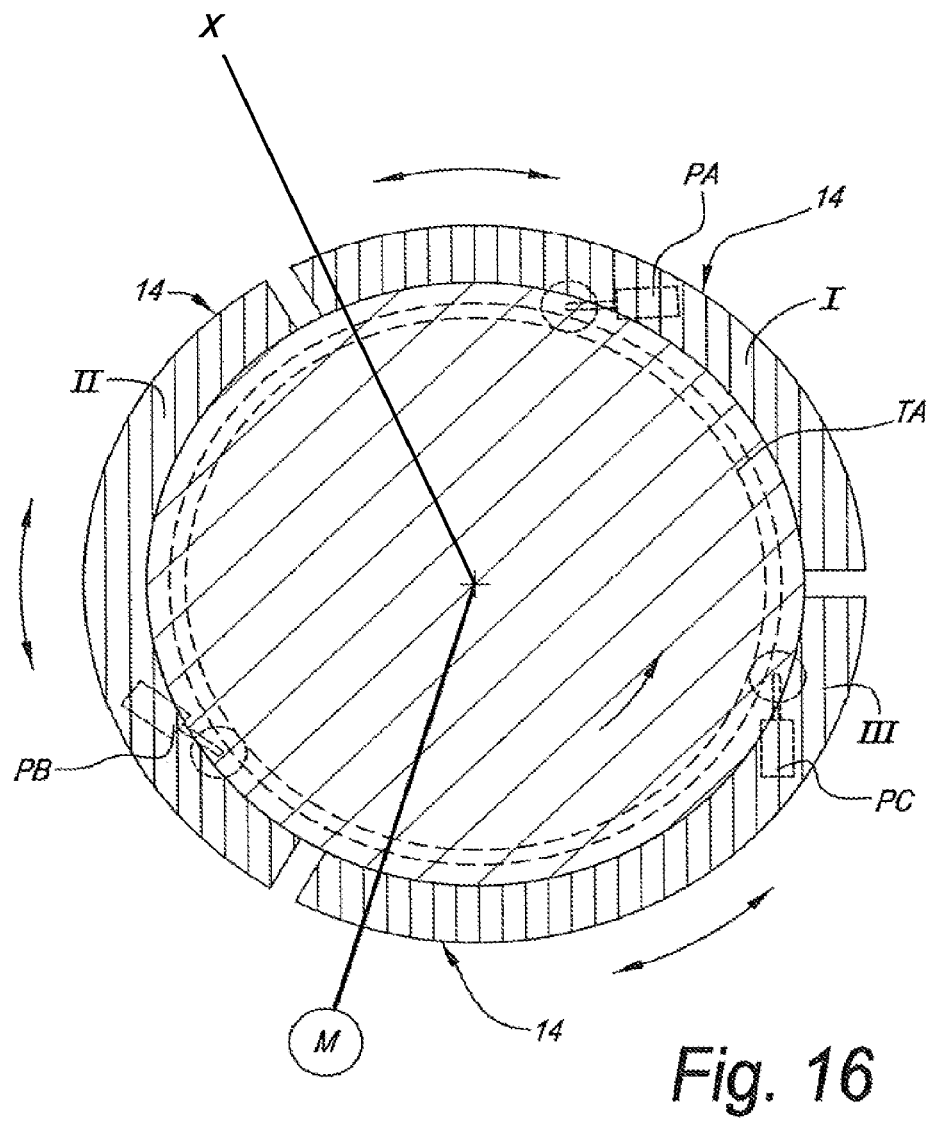

FIG. 16 represents a variant with a central shaft, which can be a large hollow shaft which, via a motor M, provides for the general rotation. The segments I-II-III are made as shells, which are mutually displaceable in order to adjust the intermediate space of the shell which then starts contacting the material web and the preceding shell, by means of drives, such as servos PA-PB-PC. This is possible, for example, in that the servos cooperate with a gearwheel TA, which cooperation determines the position of each segment in respect to the shaft.

It is clear that said segments I-II-III form the herein above-mentioned embossing elements 14.

It is noted that, although in FIGS. 8 to 10 only schematically one layer for the material web 4 is represented, whereas in FIGS. 11 to 16 no material web is represented, the technique described by means of these figures can also be applied in combination with everything described in the introduction as well as by means of FIGS. 1 to 2.

Substantially, FIGS. 5 to 16 aim at describing a roller which applies the technique of the invention and thus also can be applied in a production process according to FIG. 1.

As known, by LVT tiles square tiles as well as rectangular plank-shaped tiles may be understood.

The printed motif can imitate a well-defined material, such as wood or stone, but may also be a fancy motif.

In the case that the motif represents wooden planks, these may be situated with their longitudinal direction parallel to the longitudinal direction of the material web as well as transverse thereto. The embossment motifs on the roller then are directed circumferentially or axially, respectively.

It is noted that the technique of the invention for bringing the embossments into register with the printed motif and maintaining it like this, possibly can also be combined with other techniques aiming at the same effect. Such other techniques are, for example, the controlled stretching of the decor layer prior to the lamination thereof and/or the controlled stretching of the entire material web prior to feeding it to the roller.

Herein above, the "intermediate spaces" and "intermediate distances" form identical terms. When these are "varied" or "altered", it is meant that the distance thereof is altered in circumferential direction. Thus, an "intermediate space" does not necessarily have to be considered a completely open space, but substantially only aims at an interval which is present between two embossing patterns, or between the beginning and end of the same embossing pattern.

The present invention is in no way restricted to the embodiments described by way of example and represented in the figures; on the contrary, such methods and device can be realized according to various variants, without leaving the scope of the invention.

The invention claimed is:

1. A method for manufacturing a product having a surface provided with embossments, comprising the steps of:
bringing a material web into contact with a roller, the roller having a variable circumference and a relief at a surface of the roller;
forming one of the embossments in the material web by the relief of the roller;
placing the embossment in register with a printed motif present on the material web;
automatically adjusting a position of the relief in respect to the printed motif by varying the variable circumference;
wherein the roller has at least first and second segment-shaped embossing elements, arranged along the variable circumference thereof and defining the relief, at least first and second intermediate spaces disposed about the variable circumference between the at least first and second segment-shaped embossing elements;
wherein the at least first and second segment-shaped embossing elements are automatically angularly adjusted relative to one another by rotating one of the at least first and second segment-shaped embossing elements relative to another one of the at least first and second segment-shaped embossing elements about an axis of the roller according to the printed motif, said at least first and second intermediate spaces defining distances relative to one another according to an angular adjustment of the at least first and second segment-shaped embossing elements;
wherein the angular adjustment of the first segment-shaped embossing element includes the step of rotating the first segment-shaped embossing element about the axis such that a first end of the first segment-shaped embossing element is closer to a second end of the second segment-shaped embossing element than a second end of the first segment-shaped embossing element to a first end of the second segment-shaped embossing element.

2. The method of claim 1, wherein in a first condition the at least first and second intermediate spaces have generally a same value, wherein in a second condition such that the first segment-shaped embossing element is angularly adjusted about the axis at a first angle relative to the second segment-shaped embossing element, the at least first and second intermediate spaces have different values.

3. The method of claim 1, comprising the step of performing the angular adjustment by detection of the printed motif.

4. The method of claim 1, further comprising the step of bending the material web around the roller, such that cooperation between the relief and the material web is over an arc-shaped profile.

5. The method of claim 1, wherein the at least first and second segment-shaped embossing elements each define an arc-shape.

6. The method of claim 5, wherein the at least first and second segment-shaped embossing elements have a same shape and a same length.

7. The method of claim 5, wherein the at least first and second segment-shaped embossing elements are arranged diagonally opposite one another.

8. The method of claim 5, wherein the at least first and second segment-shaped embossing elements are each driven by a separate motor and correspondingly rotated about the axis relative to one another.

9. The method of claim 1, further comprising the step of supplying the material web, or at least a surface thereof to be provided with the embossments, to the roller in a heated condition, and arranging the roller in a cooled condition.

10. The method of claim 1, wherein the material web comprises synthetic material.

11. The method of claim 1, wherein the material web comprises a continuous material web, which, after providing the embossments, the method further comprises the step of cutting the continuous web into floor panels.

12. The method of claim 1, wherein the angular adjustment of each of the at least first and second segment-shaped embossing elements is realized by a drive system integrated in the roller and controlled automatically on the basis of feed forward or feedback of the material web.

13. The method of claim 12, wherein a sensor or a detection mechanism acts on a location of the printed motif after which the variable circumference of the roller is adjusted as a function of detection by the sensor or the detection mechanism and by the drive system.

14. The method of claim 1, wherein the first intermediate space is defined between the first end of the first segment-shaped embossing element and the second end of the second segment-shaped embossing element, and the second intermediate space is defined between the second end of the first segment-shaped embossing element and the first end of the second segment-shaped embossing element, the first intermediate space having a shorter length than the second intermediate space.

15. A method for manufacturing a product having a surface provided with embossments, comprising the steps of:
bringing a material web into contact with a roller, the roller having a variable circumference and a relief at a surface of the roller;
forming one of the embossments in the material web by the relief of the roller;
placing the embossment in register with a printed motif present on the material web;
automatically adjusting a position of the relief in respect to the printed motif by varying the variable circumference; wherein the roller has at least first and second segment-shaped embossing elements, arranged along the variable circumference thereof and defining the relief, at least first and second intermediate spaces disposed about the variable circumference between the at least first and second segment-shaped embossing elements;
wherein the first and second segment-shaped embossing elements are automatically angularly adjusted relative to one another by rotating one of the at least first and second segment-shaped embossing elements relative to another one of the at least first and second segment-shaped embossing elements about an axis of the roller according to the printed motif, said at least first and second intermediate spaces defining distances relative to one another according to an angular adjustment of the at least first and second segment-shaped embossing elements;
wherein in a first condition the at least first and second intermediate spaces have generally a same value, wherein in a second condition such that the first segment-shaped embossing element is angularly adjusted about the axis at a first angle relative to the second segment-shaped embossing element, the at least first and second intermediate spaces have different values;
wherein the at least first and second segment-shaped embossing elements each define an arc-shape.

16. The method of claim 15, wherein the at least first and second segment-shaped embossing elements have a same shape and a same length.

17. The method of claim 15, further comprising the step of supplying the material web, or at least a surface thereof to be provided with the embossments, to the roller in a heated condition, and arranging the roller in a cooled condition.

18. The method of claim 15, wherein the angular adjustment of the first segment-shaped embossing element includes the step of rotating the first segment-shaped embossing element about the axis such that a first end of the first segment-shaped embossing element is closer to a second end of the second segment-shaped embossing element than a second end of the first segment-shaped embossing element to a first end of the second segment-shaped embossing element.

19. A method for manufacturing a product having a surface provided with embossments, comprising the steps of:
bringing a material web into contact with a roller, the roller having a variable circumference and a relief at a surface of the roller;
forming one of the embossments in the material web by the relief of the roller;
placing the embossment in register with a printed motif present on the material web;
automatically adjusting a position of the relief in respect to the printed motif by varying the variable circumference;
wherein the roller has at least first and second segment-shaped embossing elements, arranged along the variable circumference thereof and defining the relief, at least first and second intermediate spaces disposed about the variable circumference between the at least first and second segment-shaped embossing elements;
wherein the first and second segment-shaped embossing elements are automatically angularly adjusted relative to one another by rotating one of the at least first and second segment-shaped embossing elements relative to another one of the at least first and second segment-shaped embossing elements about an axis of the roller according to the printed motif, said at least first and second intermediate spaces defining distances relative to one another according to an angular adjustment of the at least first and second segment-shaped embossing elements;
wherein the at least first and second segment-shaped embossing elements each define an arc-shape;
wherein the first intermediate space is defined between the first end of the first segment-shaped embossing element and the second end of the second segment-shaped embossing element, and the second intermediate space is defined between the second end of the first segment-shaped embossing element and the first end of the second segment-shaped embossing element, the first intermediate space having a shorter length than the second intermediate space.

* * * * *